United States Patent [19]

Farcella et al.

[11] Patent Number: 5,680,260
[45] Date of Patent: Oct. 21, 1997

[54] OPTICAL ELEMENT ASSEMBLY HAVING OPTICAL ELEMENTS WITH MOUNTING EXTENSIONS

[75] Inventors: Martin P. Farcella; Joseph R. Bietry, both of Rochester; Paul D. Ludington, Brockport, all of N.Y.

[73] Assignee: Eastman Kodak Company, Rochester, N.Y.

[21] Appl. No.: 631,471

[22] Filed: Apr. 12, 1996

[51] Int. Cl.$^6$ ............................................. G02B 7/02
[52] U.S. Cl. ............................. 359/819; 39/818
[58] Field of Search ............................ 359/819, 811, 359/818

[56]           References Cited

U.S. PATENT DOCUMENTS

| | | | |
|---|---|---|---|
| 4,408,830 | 10/1983 | Wutherich | 359/811 |
| 5,210,648 | 5/1993 | Bedzyk | 359/813 |
| 5,220,460 | 6/1993 | Bedzyk | 359/813 |
| 5,249,082 | 9/1993 | Newman | 359/813 |
| 5,353,166 | 10/1994 | Hanford | 359/819 |
| 5,461,444 | 10/1995 | Okura | 354/286 |
| 5,523,893 | 6/1996 | Haas | 359/820 |
| 5,525,194 | 6/1996 | Ruffell | 359/827 |
| 5,537,262 | 7/1996 | Aoki | 359/822 |

*Primary Examiner*—Georgia Y. Epps
*Assistant Examiner*—Ricky Mack
*Attorney, Agent, or Firm*—Svetlana Z. Short

[57]           ABSTRACT

An optical element assembly includes at least first and second optical elements. Each element has molded extensions to assist in the mounting. A pair of pins extend from the extensions on one element and fit into a pair of openings on the extensions of the other element. A clip having a hole in one leg to fit over the pin is positioned to urge each set of extensions together to prevent axial movement of one element with respect to the other.

4 Claims, 2 Drawing Sheets

1

OPTICAL ELEMENT ASSEMBLY HAVING OPTICAL ELEMENTS WITH MOUNTING EXTENSIONS

OPTICAL ELEMENT ASSEMBLY

This invention relates to the mounting of optical elements, for example, lens elements, prisms and other optical elements whose spacing and orientation with respect to each other is important to the function of an optical element assembly.

The mounting of optical elements is critical both to the expense of an optical element assembly and to its performance. An effective mounting approach provides the proper spacing between optical elements and avoids undesired tilt and decentration of the elements with respect to an optical axis. In addition, it should be durable, easy to assemble and inexpensive.

Since the early days of molding plastic lenses, it has been common to include in the molded optical elements, extensions cooperating with whatever mounting approach is used. Typically, these extensions are sized to fit a camera, viewfinder, magnifier or eyepiece housing with the use of either adhesives or springs to properly position them in the optical device.

SUMMARY OF THE INVENTION

It is an object of the invention to provide an optical element assembly in which at least two optical elements are oriented and spaced accurately with respect to each other in a simple and inexpensive construction.

This and other objects are accomplished by an optical element assembly having at least first and second optical elements. Each of the optical elements has an optical axis and an optical surface portion with first and second mounting extensions extending away from the optical axis from the surface portions. First and second pins extend axially from the first and second mounting extensions, respectively, of the second optical element. First and second openings in the first and second mounting extensions of the first optical element are positioned to receive the first and second pins. Means are provided to prevent relative axial movement of the optical elements, thereby securing the two elements with respect to each other.

According to a preferred embodiment, the means for preventing relative axial movement are first and second clips which fit over the first and second mounting extensions of both optical elements, each clip having two resilient legs urging the extensions axially together.

According to another preferred embodiment, the extensions themselves have flat surfaces which engage the complimentary flat surfaces on the other element with the axial thickness of the extensions providing the proper spacing and orientation between the elements. At the same time, the pins and openings prevent relative movement transverse to the axis and the clips prevent movement along the axis between the elements.

With this structure, the accuracy of modem molding permits extremely accurate positioning of two or more optical elements with the only non-molded additional part being quite inexpensive clips. The assembly is durable and easy to assemble.

DETAILED DESCRIPTION OF THE PREFERRED EMBODIMENTS

Figure 1:
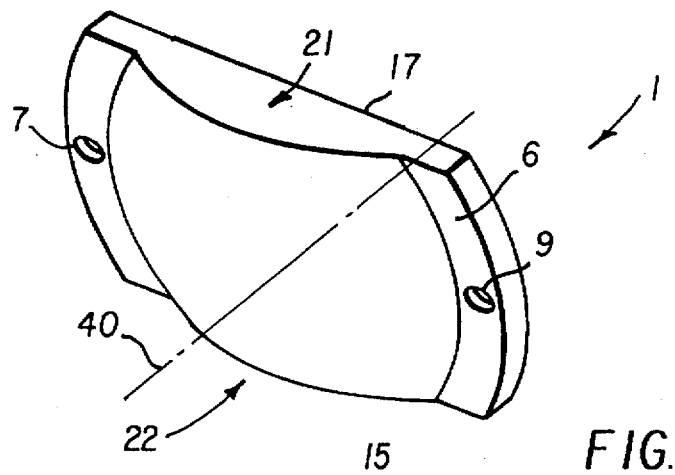
FIGS. 1 and 2 are perspective views of moldable optical elements.
Figure 2:
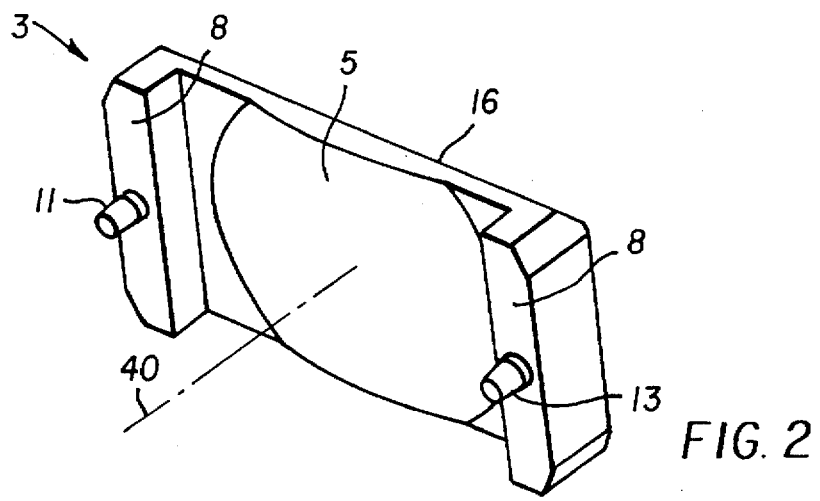
Figure 3:
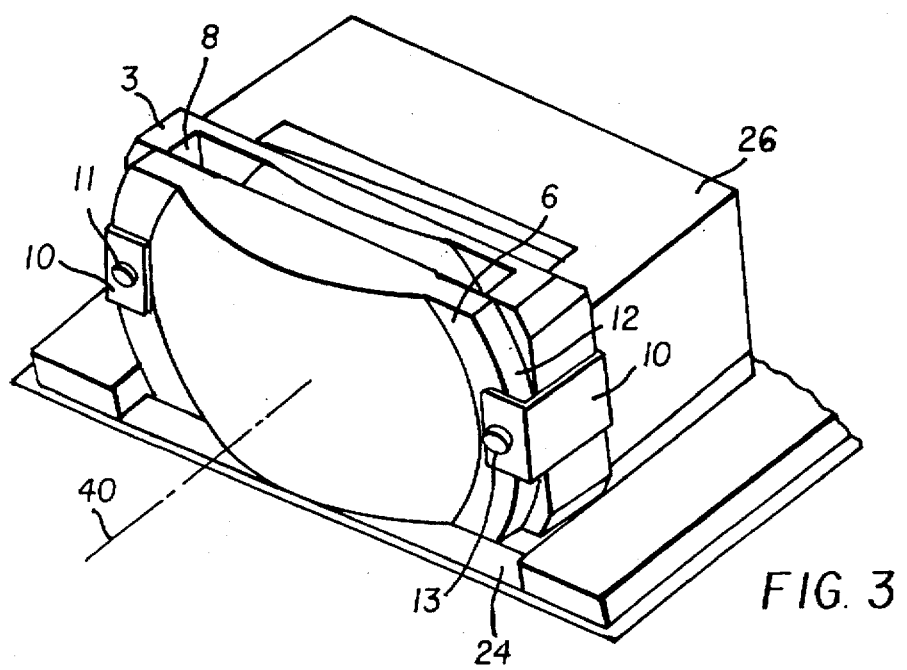
FIG. 3 is a perspective view of an optical element assembly with some additional housing and support structure shown.
Figure 4:
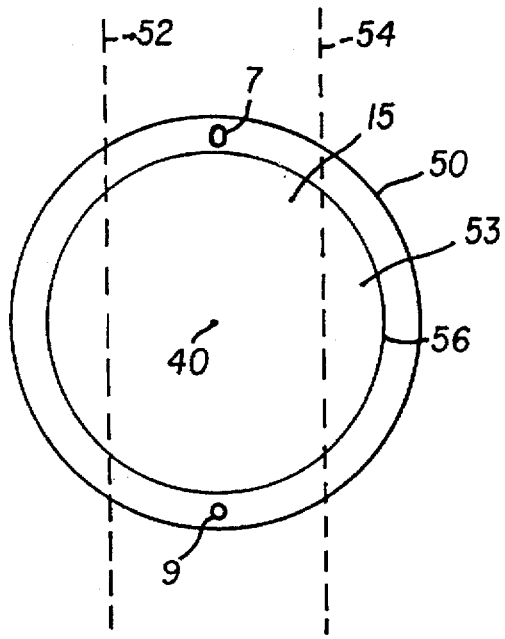
FIG. 4 is a top view of a plastic lens element before segmentation.
Figure 5:
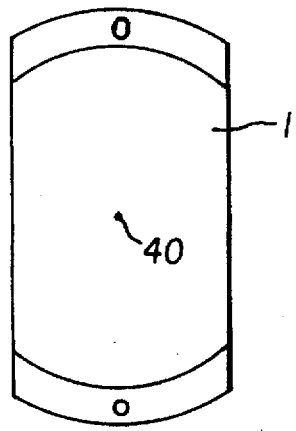
FIG. 5 is a top view of a plastic lens element after segmentation.
Figure 6:
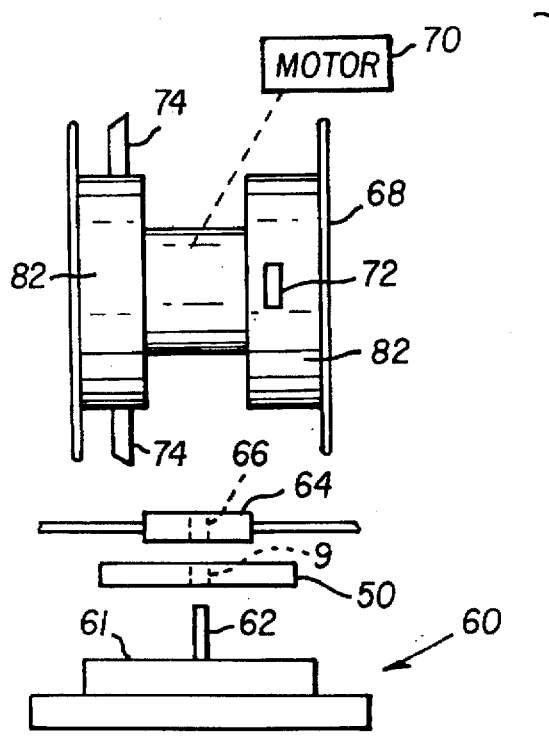
FIG. 6 is an exploded view of an apparatus for severing a segment of a lens element.
Figure 7:
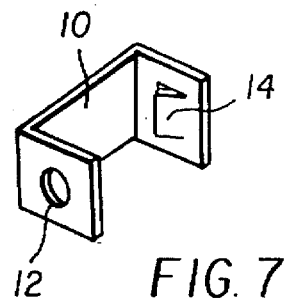
FIG. 7 is a perspective view of a clip.

FIG. 3 shows a completed optical element assembly made up of components shown in FIGS. 1, 2 and 7. FIGS. 4, 5 and 6 illustrate a manufacturing process for manufacturing one or both of the optical elements shown in FIGS. 1 and 2. This manufacturing process makes use of some of the features also utilized by the optical element assembly shown in FIGS. 1-3 and 7. The elements shown in FIGS. 1 and 2 can be made by other processes than that shown in FIGS. 4-6.

Referring to FIG. 1, an optical lens element has an optical surface portion which includes opposing surfaces 15 and 17 which define an optical axis 40. The element is generally rectangular in shape. It can be molded in this rectangular shape or can be molded round and made rectangular by a severing process described with respect to FIGS. 4, 5 and 6. Surfaces 15 and 17 are usually spherical surfaces, although one or both of them can be aspheric or planar. A diffractive pattern can also be etched or molded into one or both of the surfaces.

Lens element 1 includes extensions 6 away from optical axis 40 which are used for positioning lens element 1 in an optical element assembly to be described. Extensions 6 contain openings or holes 7 and 9. Opening 9 is circular in cross-section, while opening 7 is elongated in a direction away from axis 40 and opening 9.

FIG. 2 shows a second optical element 3. Optical element 3 is a combination lens-prism, but the invention could also be used even though optical element 3 were a lens element similar to element 1 or another molded optical component which needs preciseness in its mounting. The second optical element 3 has an optical surface portion which includes a spherical (or planar or aspherical) optical surface 5, a reflecting surface 16 and an exit or entrance surface 18 to the prism portion of the element. The second optical element 3 includes extensions 8 extending away from optical axis 40 which have a thickness in the axial direction designed to properly space the elements 1 and 3. Axially directed pins 11 and 13 are molded into extensions 8. Preferably, they are tapered for ease in assembly. Opening 9 is positioned to snugly receive pin 13, preventing linear movement between the optical elements orthogonal to axis 40. Opening 7 is an oblong slot positioned to receive pin 11 and be snug in a vertical direction, as shown in FIGS. 1 and 2 to prevent rotation of element 1 around pin 13.

Referring to FIG. 7, a clip 10 has two legs, one leg including an opening 12 and the other leg including a bent portion 14. As shown in FIG. 3, two clips 10 are used to secure the optical elements together with the hole 12 in each clip fitting over one of pins 11 and 13, respectively. The bent portion 14 is angled in a direction giving it a "pawl-like" effect, permitting easy placement of the clip 10 around the edges of the extensions but resisting accidental removal of the clip. The clips prevent axial movement of either element with respect to the other.

Accuracy of the relative location of the elements is determined by the accuracy of the molding of the positions of the pins 11 and 13, the openings 7 and 9 and the facing surfaces of the extensions 6 and 8 which engage each other when the clips are in place. A molding process that provides the accuracy required for the optical surfaces can easily provide the accuracy required for these surfaces and elements. The only additional components to the assembly are the clips 10 which need not be particularly precise and are quite inexpensive.

FIG. 3 shows the assembly, a housing 24 with a support structure 26 that is fixed to element 3 by adhesive, pins and slots or other mechanism.

The elements 1 and 3 are shown as rectangular in general shape, which form particularly lends itself to the invention. However, the invention is not restricted to such use, and can be used with round elements or elements of other general shapes.

For cost reasons it is preferable that each of the elements 1 and 3 be molded as shown. This is feasible for the large majority of applications. However, somewhat higher quality lens elements can be made by molding the lenses round, as shown in FIG. 4, and then making them somewhat rectangular (as shown in FIG. 5) by severing segments of the round elements, as will now be described.

Referring to FIGS. 4 and 5, segmented lens elements can be prepared by molding round elements, such as an element 50, and then severing segments, such as segments 53, by cutting or sawing the lens element 50 along cords 52 and 54 of the round lens element 50. Surprisingly, the superior optical quality of element 50 does not suffer from the severing process, and a higher quality element is produced than by originally molding element 1 in a segmented or rectangular mold.

FIG. 6 illustrates an apparatus convenient for the severing step of the process. A base 60 includes a flat surface 61 and a pair of pins 62. The molded lens element 50, with molded holes 7 and 9, fits on the flat surface 61 with the holes over the pins 62. A clamp 64 with holes 66 is secured to the top of lens element 50 with holes 66 also s fitting over pins 62. The pins prevent movement of lens element 50 toward, away from or around the optical axis 40 while the clamp 64 prevents movement of the lens element 50 along the optical axis 40.

A fly cutter 68 driven by a motor 70 includes a pair of cutting bits 74 and 72 on each of two wheels 82. The fly cutter 68 is moved into an edge of lens element 50 and proceeds along both cords 52 and 54 to cut segments off lens element 50 and provide a segmented lens element, such as lens element 1, shown in FIG. 5 and in FIG. 1. The lens can be molded so that any molding runner is connected at one or both of the segments and gets severed as well.

The invention has been described in detail with particular reference to a preferred embodiment thereof, but it will be understood that variations and modifications can be effected within the spirit and scope of the invention as described hereinabove and as defined in the appended claims.

We claim:

1. An optical element assembly comprising:

at least first and second optical elements, each of said optical elements having an optical axis and an optical surface portion with first and second mounting extensions extending away from the optical axis from the surface portions, first and second pins extending axially from the first and second mounting extensions, respectively, of the second optical element, first and second openings on the first and second mounting extensions of the first optical element, said openings positioned to receive the first and second pins, and means for preventing relative axial movement of the optical elements.

2. An optical element assembly comprising:

at least first and second one-piece molded optical elements, each optical element having an optical surface portion defining an optical axis and first and second mounting extensions extending away from the optical axis, first and second pins extending axially from the first and second mounting extensions of the second optical element, first and second openings in the first and second mounting extensions, respectively, of the first optical element, the first opening being positioned and sized to receive snugly the first pin, the second opening being elongated away from the first opening and being sized to receive the second pin while snugly preventing movement of the first element around the first pin, the first and second extensions of one or both of the elements being extended axially to space the surface portions of the elements, and first and second clips fitting over the first and second mounting extensions of both optical elements, each clip having two resilient legs urging the extensions axially together and preventing relative axial movement between the first and second elements.

3. An optical element assembly according to claim 2 wherein each clip is metallic and has a pair of parallel legs, one leg having an opening to fit over one of said pins.

4. An optical element assembly according to claim 3 wherein the other leg has a bent portion resisting sliding movement of the leg with respect to a surface of the extension.

* * * * *